Oct. 26, 1965     P. F. MAEDER     3,214,614
HIGH-EFFICIENCY A.C. MHD APPARATUS
Filed April 24, 1961     2 Sheets-Sheet 1

FIG. I

INVENTOR.
PAUL F. MAEDER
BY
Dike, Thompson, Bronstein & Mrose
ATTORNEYS

INVENTOR.
PAUL F. MAEDER

United States Patent Office

3,214,614
Patented Oct. 26, 1965

3,214,614
HIGH-EFFICIENCY A.C. MHD APPARATUS
Paul F. Maeder, East Providence, R.I., assignor of one-half to Paul Levinger, Providence, R.I.
Filed Apr. 24, 1961, Ser. No. 104,901
8 Claims. (Cl. 310—11)

The present invention relates to improvements in alternating current magnetohydrodynamic (MHD) apparatus and, in one particular aspect, to novel and improved alternating current electrical power generating apparatus operating on magnetohydrodynamic principles in which operating efficiency is significantly increased and in which manufacturing cost, complexity and bulk are minimized by stators of unique design and construction.

Magnetohydrodynamic phenomena, which involve effects of the interactions between magnetic fields and conductive fluids, have heretofore been exploited both for pumping purposes and for the generation of electric power. And, recent technological advances, associated with the creation of highly-ionized conductive gaseous fluids at exceedingly high temperatures, have offered some promise that electric power generation might be achieved on a commercial scale and on a competitive economic basis. In practice of the most promising conventional techniques in this art, however, it has appeared essential that electrode surfaces be disposed in electrically conductive contact with the fluids, and this constitutes a serious disadvantage in that the electrodes are eroded and consumed at the destructively high temperatures involved. Moreover, the electrical output signals collected by these are wholly unidirectional, and the A.-C. form of power which is more desirable for many purposes is then obtained only through use of costly and complicated D.-C. to A.-C. conversion equipments.

Origins of the severe thermal problems are found in the fact that a needed degree of electrical conductivity is not reached with certain useful gaseous fluids until ionizing temperatures above about 4,000° F. are developed. This not only exceeds the temperatures required to maintain good magnetic and electrical characteristics of other common materials involved in the generator structure but may also be higher than their melting points. If significant cooling is then resorted to, particularly in connection with the consumable electrodes, the fluid contiguous with the electrode surfaces is likewise cooled and therefore tends to lose much of the electrical conductivity which it must possess for efficient tapping of a power output. In avoiding these problems, A.-C. electrical signals may instead be generated directly, without intermediate D.-C. to A.-C. conversions, by effects involving electromagnetic induction. Specifically, a polyphase winding array may be employed to sweep a linearly-travelling magnetic field axially along a cooled hollow ceramic-lined annular passageway at a predetermined apparent velocity, while high-temperature ionized gas is forced linearly through the passageway in the axial direction at a velocity in excess of the apparent velocity of the travelling field, to occasion induction of electrical output in the winding array. As a practical matter, the losses in energy and efficiency because of unmatched magnetohydrodynamic conditions as the fluid enters and leaves the vicinity of the windings may constitute major obstacles. Theoretically, an infinitely-long wound stator assembly is required to establish optimum phasing and matching, but the bulk of even a modest-capacity MHD generator tends to be inherently very large, nevertheless, and any means for circumventing increases in stator size is therefore extremely important. However, according to the present teachings, magnetohydrodynamic efficiency can be significantly increased while stator bulk and complexity is kept to a minimum, through a unique combination of compensating windings and baffles.

It is one of the objects of the present invention, therefore, to provide novel and improved A.-C. magnetohydrodynamic apparatus wherein efficiency is promoted by improvements in certain matching characteristics.

Another object is to provide an A.-C. MHD generator having compensating windings and baffles of simple low-cost manufacture which improve operating efficiency and facilitate the design of generators with minimum bulk.

Still further it is an object to provide improved A.-C. magnetohydrodynamic apparatus in which regenerative feedback effects are developed between end compensation windings.

By way of a summary account of practice of this invention in one of its aspects, an electrically conductive gaseous fluid is developed by ionization of a gas at a very high temperature, and this conductive fluid is forced through a substantially linearly-directed annular flow passage appearing between coaxial stator core members of a stator assembly. Polyphase linearly-developed stator windings distributed along the stator assembly are connected such that, when energized, they tend to generate resultant magnetic fields having intensity variations shifting longitudinally along the annular flow passage in the upstream-to-downstream flow direction at a synchronous high velocity. The ionized gas is released into the flow passage at a sufficiently high pressure, and escapes from it to a site of a sufficiently lowered pressure, such that it must attain a linear velocity in excess of the apparent velocity of the aforesaid resultant magnetic fields in the same linear direction. In the course of its flow through the generator passage, the ionized gas displays the characteristics of a good electrical conductor and therefore tends to have intense electrical currents induced in it by the magnetic field from the stator. These currents traverse closed loops about the annular passageway. In turn, the magnetic fields associated with these current loops induce electrical output signals in the stator windings. This generator action tends to create a desired pattern of polyphase output signals in the stator windings which both supplies an external load and simultaneously provides its own self-excitation. Frequency of the output is fixed at a natural frequency of the apparatus established either by external capacitive reactance tuning the stator windings or by the frequency of synchronous apparatus parallelled with the stator windings. Surfaces which border the fluid passage and come in contact with the extremely hot ionized gases are formed entirely by a highly infusible lining material, such as ceramic, which is intended to exhibit a poor electrical conductivity and which is cooled by recirculated fluids of relatively low temperature which are forced through coolant flow channels in the stator assembly. Upstream in relation to the aforesaid stator windings there is mounted a further end winding the magnetic field of which is substantially radial in relation to the annular flow passage between the coaxial core members. This further winding would also tend to induce current flowing through the ionized gas in closed loops about the annular passage in the same manner as the currents induced by the main stator windings, except that such current flow is intentionally suppressed by a plurality of non-magnetic non-conducting radial baffles underlying the compensating winding for slightly more than its axial length. A similar end winding is disposed immediately downstream of the main stator windings, together with like radial insulating baffles which there suppress the formation of current loops about the annular flow passage. Both the upstream and downstream baffles conveniently serve to support the two stator core members in the spaced coaxial relationship which forms the annular flow passage. Ceramic lining which protects the internal surfaces of the stator assembly from destructive effects of the high-temperature ionized gases preferably extends across the surfaces of the baffles, to protect these as well. The downstream and upstream end windings are coupled together, in a regenerative relationship whereby at least some of the energy recovered from the moving electromagnetic field by the downstream end winding is supplied to the upstream end winding, and these end windings are also tuned to the synchronous frequency at which the generator operates. The end windings and their cooperating baffles operate to eliminate sharp discontinuities and mismatches in the generator and thereby improve the efficiency of power generation.

Although the features of this invention which are believed to be novel are set forth in the appended claims, details as to its organization and mode of operation, together with the further objects and advantages thereof, may best be understood through reference to the following description taken in connection with the accompanying drawings, wherein:

Figure 5:
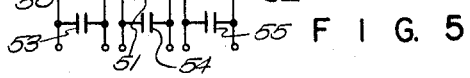
Figure 4:
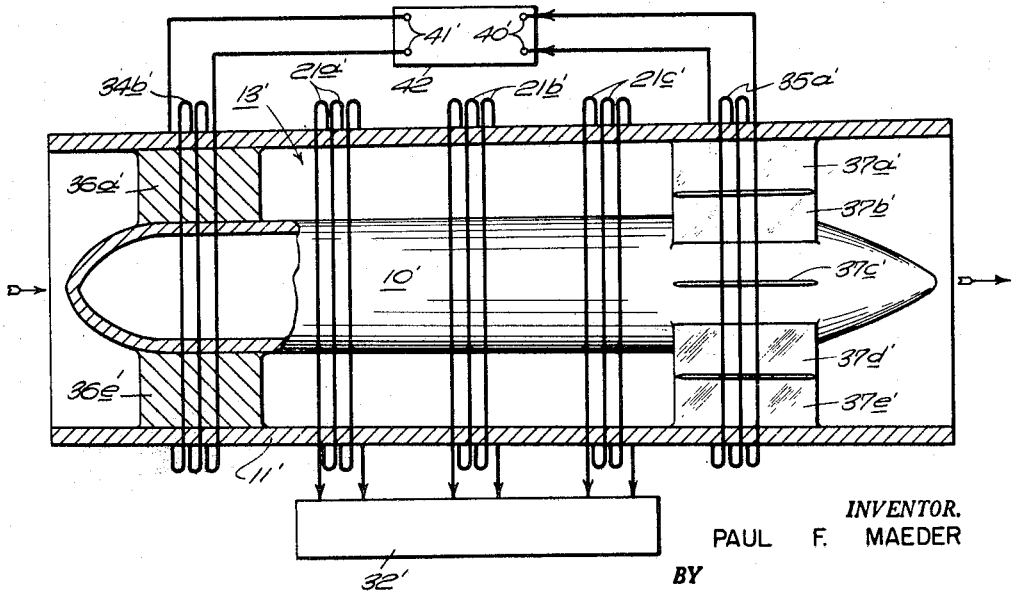

FIGURE 4 portrays an alternative MHD apparatus, in part in sectioned, block, and elementary pictorial forms; and FIGURE 5 is a simplified and partly schematic illustration of an improved MHD device.

Figure 1:
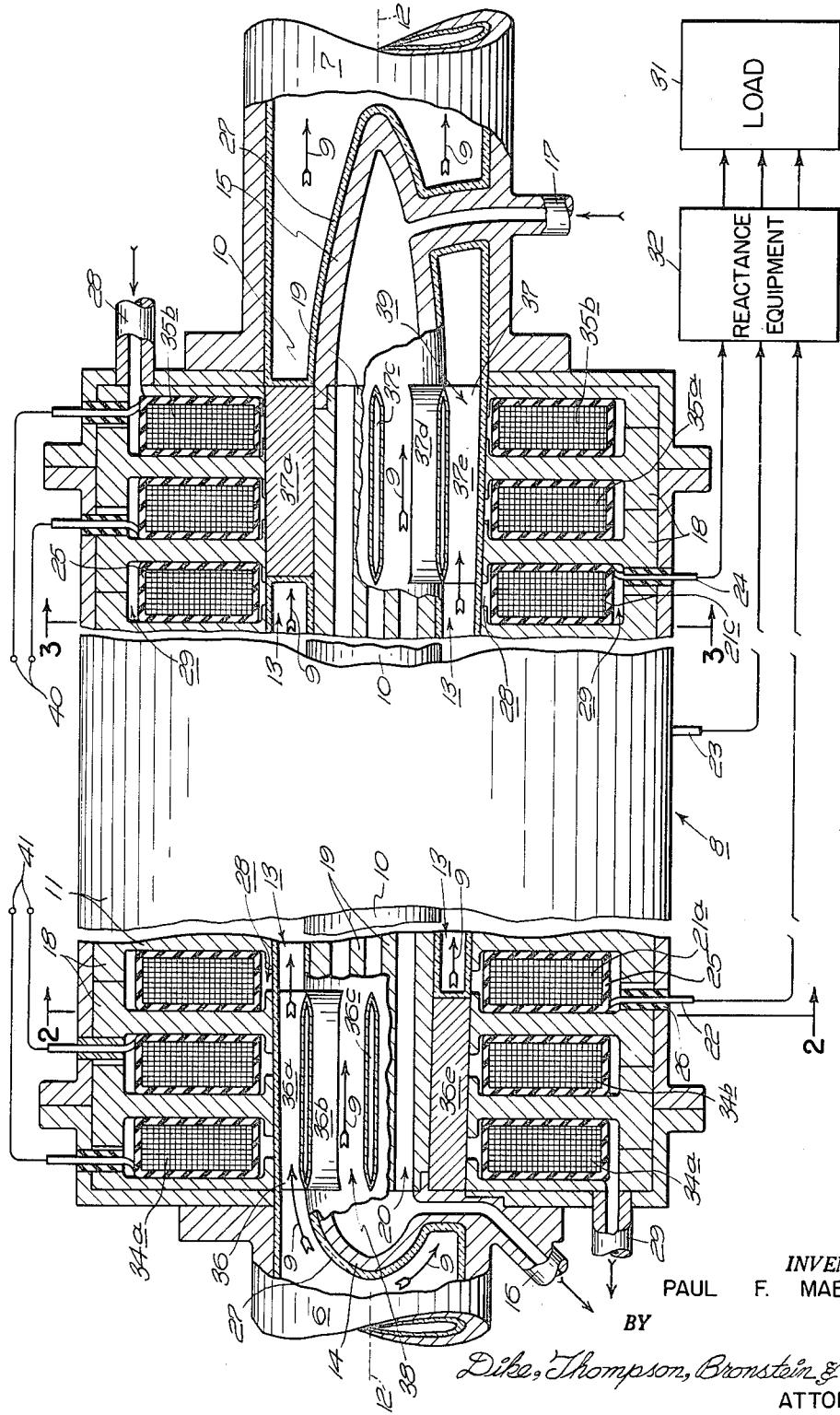
FIGURE 1 is a partly sectioned side view of one embodiment of an improved magnetohydrodynamic alternator in which teachings of this invention are practiced.
Figure 2:
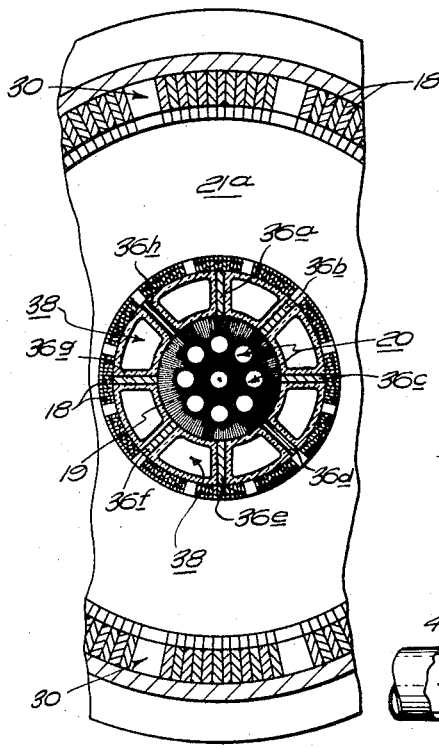
FIGURE 2 represents part of a transverse cross-section of the alternator of FIGURE 1, taken along section line 2—2.
Figure 3:
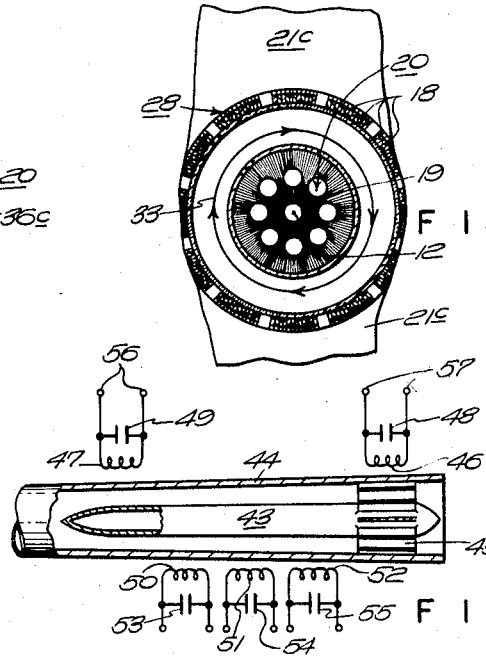
FIGURE 3 represents part of a transverse cross-section of the alternator of FIGURE 1, taken along section line 3—3.

In the embodiment depicted in FIGURES 1 through 3, the alternating current generating equipment includes an upstream inlet 6 and downstream outlet 7 for coupling the flow of an electrically conductive fluid through the hollow annular interior of an enclosed polyphase stator structure 8 in the paths indicated by arrows 9. The generally cylindrical stator structure comprises an inner core assembly 10 and cooperating annular outer core and winding assembly 11 which is concentric with it about the central longitudinal axis 12—12, the two core assemblies being separated by a hollow radial gap defining an elongated annular fluid passageway 13. Streamlined upstream and downstream brackets 14 and 15, respectively, guide the high-velocity fluid flow through the generator with reduced pressure drops and turbulence, and are formed with hollow interiors connecting with external conduits 16 and 17, respectively, for coolant circulation purposes described later herein. The magnetic material of both the center and outer core assemblies is subdivided in a known way to minimize losses due to certain eddy current circulations, and in the illustrated apparatus the cores are fabricated of substantially radial outer and inner laminations 18 and 19, respectively, which extend in the longitudinal direction of the assembly. A plurality of longitudinal passages 20 extending through the central laminations 19 afford access to the inner core material by a circulated coolant fluid forced from inlet conduit 17 through the center core structure to outlet conduit 16.

The outer stator assembly 11 includes a plurality of electrical windings 21a–21c in association with the core laminations 18. These windings are in a known polyphase interconnection (not illustrated) and distribution designed to develop magnetic flux extending substantially radially through the annular passageway 13 and exhibiting a substantially sinusoidal and apparently-moving intensity distribution in the longitudinal direction along the passageway. Each phase winding may be, and preferably is, comprised of a number of insulated annular winding sections such as the sections 21a and 21c portrayed in FIGURES 1–3, whereby the magnetic field distribution may be made to approximate a sinusoid very closely, according to known practices in the arrangement of polyphase windings. While the generated magnetic fields of course result from excitation of the polyphase windings, this is a self-excitation at the terminals 22–24, and no separate source of polyphase electrical power is actually required. The winding interconnections may conveniently be the same as those of the field windings which develop the rotating fields of conventional alternating current motors, for example, although it will be understood that the windings 21a–21c are in a linear rather than an annular array and consequently produce a linearly- or axially-moving travelling field rather than a rotating magnetic field pattern. Phasing is set to develop travelling-field patterns which move in the longitudinal upstream-to-downstream direction of the generator.

Electrical insulation 25 about the winding sections and electrical isolators 26 about the bus bar terminals 22–24 may comprise the common insulation materials employed in high-temperature installations, examples of which are silicone-impregnated mica and glass fabrics, and ceramic insulators. All surfaces exposed to the hot ionized fluids coursing through the generator from upstream conduit 6 to downstream conduit 7 are lined with a smooth and essentially uninterrupted ceramic coating 27, which is substantially immune to attack and melting by the fluids and which is also electrically non-conducting. Coolant fluid is circulated not only through the inner core structure, from conduit 17 to conduit 16, but through the outer core and winding assembly as well, from conduit 28 to conduit 29. Coolant may course through spaces such as those identified at 28, 29 and 30, to absorb thermal energy and prevent the build-up of destructively high temperatures within the generator structure. A further noteworthy constructional feature is that the generally annular fluid flow passageway is of increasing cross-sectional area in the upstream-to-downstream direction, this area increasing in proportion to pressure drops along the passageway for the purpose of preserving the fluid linear velocities substantially the same throughout the generator. For this reason, the flow passageway is somewhat frustroconical in shape.

Terminals 22–24 connect the main polyphase windings with output busses and to a load 31 through reactance equipment 32. The latter may comprise synchronous machinery, such as a synchronous alternator, motor or converter parallelled with a polyphase generator windings or, alternatively, may comprise tuning capacitors parallelled with these windings. In each instance, the equipment 32 aids in establishing a synchronous operating frequency for the generator and in developing the intended outputs of electrical power.

The manner in which electrical power output is generated is conveniently described by first postulating that the operating condition is one wherein polyphase excitation of the main stator windings 21a–21c produces a resultant A.-C. magnetic field the shifting pattern of which advances longitudinally along the passageway 13, in the upstream-to-downstream direction. High-temperature ionized gaseous fluid thrust through the generator passageway in the directions of arrows 9 by an outside source of a known type, is of high electrical conductivity and therefore tends to have electrical currents induced in it because of its axial motion substantially normal to the radial magnetic flux lines established by the main stator windings. These induced electrical currents tend to circulate in current loops which lie wholly within the fluid and which are transverse to and concentric with the longitudinal axis 11—11, as exemplified by the current loop 33 in FIGURE 3. The frequency of the polyphase excitation governs the linear velocity at which the undulating substantially sinusoidal resultant magnetic field advances along the passageway 13. This linear velocity is a critical one for present purposes, because net electrical output power is induced in the main windings only when the fluid linear velocity is in excess of the critical velocity. The effects are regenerative, in that the electrical signals induced in the main windings become increased as the fluid velocity is increased beyond the critical velocity, and the power made available in this manner thereby becomes adequate to provide the needed self-excitation for the main windings, and to overcome losses, and to deliver an excess to a load.

The mode of operation just described makes it apparent that the transverse current loops, such as loop 33, FIGURE 3, should be as unobstructed and free of distortion as possible along the longitudinal span of the stator field pattern produced by the main windings. However, serious difficulties tend to arise at the two sites of abrupt discontinuities appearing at each axial end of the array of main windings 21a–21c. At the upstream axial end of this array, where oncoming fluid first reaches the field of main winding 21a, the stator magnetic field characteristics ordinarily tend to be different from what they are further along the stator, because of stray flux lines. Moreover the oncoming fluid is just entering this unsual field and, while it serves as a conductor for some of the currents induced in fluid already further downstream, is at the same time having induced in it currents such as loop currents 33 which are yet not of the proper intensities. These induced currents develop their own magnetic fields which in turn react with whatever stator field is present, to complicate conditions further. In short, the irregularities in electric currents and magnetic fields result in highly complicated interactions which are different from those theoretically required for proper generator operation, and this can occasion serious losses in operating efficiency. The same conditions prevail at the downstream axial end of the array of main stator windings, although the transitions are of reverse sense, and efficiency tends to be even further impaired.

One approach to overcoming the discontinuity difficulties is that of adding end compensation windings, such that the stator assembly would essentially be made much longer and a middle section of it could be expected to have more uniform characteristics sought. Practically, this could not be accomplished without addition of such extensive windings without such an elongation of the stator structure that the resulting increases in cost and complexity and electrical and flow losses would be intolerable. In this connection it should be understood that the FIGURE 1 type of generating equipment must inherently be of great bulk and weight, for commercial or utility power generating purposes, and all added windings and core structures represent high costs. According to the present invention, some additional windings and special core structures are involved, but these are not required to be of inordinate size and are of simple construction while effecting very significant improvements in operating efficiency of the generator. Auxiliary windings for this purpose include the most upstream winding sections, 34a and 34b, and the most downstream winding sections, 35a and 35b. These winding sections are conveniently of generally the same construction as the sections of main windings 21a–21c, and are carried by and cooled within the outer stator laminations 18 in the same manner as the main windings. The auxiliary windings are purposely displaced axially from the respective ends of the linear array of the main windings 21a–21c, rather than being coextensive with any of them. However, the auxiliary windings do adjoin the ends of the array of main windings, such that there is no effective gap between them insofar as the operating characteristics are concerned. Importantly, the auxiliary windings are in surrounding relationship to annular baffling units, 36 and 37, each of which includes a number of radially-extending vanes or baffles, 36a–36h and 37a–37h, respectively. These baffles are of non-magnetic material, such that they do not shunt magnetic flux between cores 18 and 19 and will, instead, require flux to traverse each set of the eight gaps or slots 38 and 39, respectively, where the ionized fluid must travel. Non-magnetic materials such as stainless steel may be employed, or other normally magnetic materials which become substantially non-magnetic at the high temperatures involved in this device may also be used. In addition, it is important that the baffles exhibit substantially no electrical conductivity to the conductive fluid, such that current rings or loops such as loops 33 appearing in the vicinity of the main windings cannot be formed. The refractory ceramic lining 27 which extends across all interior surfaces of the generator also covers and thus becomes part of the baffles and, being eletrically insulating, provides the desired electric isolation angularly about the longitudinal axis 12—12. As is evident from the FIGURE 2 cross-section taken at the site of the upstream compensating assembly, the baffles 36a–36h inherently suppress the formation of loop currents in the fluid. The same is true of the downstream compensating assembly as well. For this purpose, it is important that the baffle assemblies 36 and 37 each be of axial length sufficient to suppress any tendencies for loop currents to cross or thread through their longitudinal slots. And, further, the radial baffles are of lengths at least equal to, and preferably in excess of, the axial span of the associated auxiliary windings. The latter construction suppresses formation of loop currents which might otherwise develop at the axial ends of the compensating winding assemblies. Coaxial support of the inner core structure of the generator in relation to the outer core structure is provided by these same baffles, a factor which can be particularly important in apparatus of large size.

The auxiliary windings may be connected in various ways, although preferably the output terminals 40 of the downstream set of windings 35a and 35b are coupled with the input terminals 41 of the upstream set of windings 34a and 34b in a manner which develops a feedback or regenerative effect. That is, electrical energy which must be supplied to the upstream windings is obtained from the downstream windings. Assuming synchronous operation of the generator, according to the explanation presented hereinabove, and with a substantially sinusoidal A.-C. flux distribution advancing downstream at a predetermined velocity, the electromagnetic field will transfer its energy to the downstream windings 35a and 35b and these in turn will transfer it to the upstream windings 34a and 34b. Electrical currents developed in the downstream windings in this process also serve to develop substantially radial magnetic field flux needed within the downstream compensating unit. Electrical power from the downstream end windings may be coupled into the upstream winding sections 34a and 34b with appropriate phasing adjustments, as needed, so that an appropriately-phased radial magnetic flux is then developed across the upstream baffle unit 38. No circular current loops can be developed at this upstream site because of the presence of the baffle, and except for certain relatively small eddy current losses, the behavior of the device at that site is as though no fluid whatsoever were present. This characteristic behavior is exceedingly important because the conditions are then such that there is no opposition to the magnetic fields being produced at that site. Accordingly, the adjoining main winding 21a develops its similar radial magnetic field without difficulty because the stator field conditions immediately upstream are well matched. The same circumstances prevail as between the field at the downstream end of main winding 21c and the adjoining field conditions across the downstream baffle unit 37. Being thus essentially matched at both axial ends, without abrupt field discontinuities, the main stator winding array operates with improved and high efficiency.

FIGURE 4 views a similar compensated MHD unit in a more schematic form, the same reference characters, with distinguishing single-prime accents, being applied to elements which are functionally similar to those appearing in the FIGURE 1 embodiment. For purposes of optimum operation, the means 42 intermediate the upstream and downstream auxiliarly windings 34b' and 35a' may include reactances such as capacitors, which tune these windings to the frequency at which the equipment is synchronous in its operation. Such phase shifting as may be required in the coupling between these windings may also be introduced by this intermediate equipment. The illustrated apparatus does not include an internal lining of insulating material, as this may be eliminated in those instances where conductive fluid temperatures are not excessive. At fluid velocities less than the aforementioned critical velocity, the apparatus does not function as a generator but, rather, as a pump, provided the main winding excitations are supplied from a suitable external source. In such an arrangement the baffle and auxiliary winding assemblies can also serve to improve operating efficiencies. Therefore, it should be understood that these teachings may be advantageously exploited where the fluid velocity is at or below the critical velocity of the apparently-moving stator field.

In the FIGURE 5 embodiment, the coaxial core members 43 and 44 are provided with a similar radial baffle array 45 which cooperates with the end winding 46 in a manner such as that described above. This end winding and the upstream end winding 47 are paralleled by capacitors, 48 and 49, respectively, which establish desired tunings. Windings 50–52 intermediate the end baffles are similarly tuned, by capacitances 53–55 respectively, although not necessarily to the same frequency for certain purposes. In this device, the downstream baffle and end winding arrangement prevents unwanted reflections in the upstream direction as the electromagnetic field advances downstream. The matching effects noted earlier herein suppress such reflections by eliminating the discontinuities which are their source. This device is useful as an electrical delay line, the electrical signal to be delayed being applied as an input to the terminals 56 of the most upstream or end winding 47. Intermediate windings 50–52 act to duplicate the signals induced by winding 47 in the flowing conductive fluid, in a longitudinally-distributed pattern. In one design, the intermediate windings produce a sinusoidal distribution of the reproduced input signal longitudinally along the device, and for this purpose the intermediate windings are then tuned to substantially the same frequency as that of the input signal and are physically distributed according to substantially the same wavelength. The intermediate windings, such as windings 50–52, may also be tuned to a frequency different from that of the input and output windings, such as the windings 47 and 46 respectively, and this may be advantageous in some instances. Under the condition when the fluid velocity is equal to the critical velocity established by the design of the intermediate windings, the output at downstream terminals 57 is a delayed one, and the device functions as an electrical delay line. At fluid velocities in excess of the critical velocity, the fluid produces a generating action creating an amplification of the signal being processed by the device. Regenerative characteristics are thus obtained with such a device, inasmuch as delay between input and output is also involved.

The conductive fluid may comprise a liquid, vapor, gas, mixture of gases, and the like, satisfying the requirements that it be or may be made highly conductive. Mercury and its conductive vapors may constitute suitable conductive fluid media for magneto-hydrodynamic apparatus operating on the principles described. Other materials which are useful are those which are liquid at normal ambient or relatively high temperatures and which are either themselves highly conductive in the gaseous state or may be rendered so by enrichment with additives. Salts, such as potassium and sodium salts e.g., potassium chloride), are known to produce such enrichment of electrical conductivity by increasing ionization. Similar effects can be realized with fluids which remain wholly in the gaseous state, rather than first being converted from the liquid form, in which case a relatively low-temperature volume of gas such as helium, argon or air, enriched as needed, may be compressed, heated and caused to expand rapidly to develop high pressures and resultant high velocity of flow.

Constructions in accordance with these teachings lend themselves to fabrication in relatively small sizes for relatively high electrical outputs at high efficiencies. Core and winding structures may be varied, the use of powdered core materials rather than shaped laminations being illustrative in this respect. The number, distribution, and interconnection of polyphase windings may also be varied (e.g., delta and Y connections, and two-phase rather than three-phase winding arrangements).

Accordingly, it is to be understood that the specific embodiments of the invention herein disclosed are of a descriptive rather than a limiting nature, and that various changes, combinations, substitutions or modifications may be effected in accordance with these teachings without departing either in spirit or scope from this invention in its broader aspects.

What I claim as new and desire to secure by Letters Patent of the United States is:

1. Magnetohydrodynamic apparatus for translating energy through a stream of electrically conductive fluid, comprising a plurality of electrical windings for developing a periodically varying magnetic flux field having an intensity distribution along a predetermined elongated path, means guiding flow of said fluid through said magnetic flux field along said path and forming substantially unobstructed paths at the sites of said electrical windings for net electrical currents induced in said fluid to circulate transversely in relation to the direction of said intensity distribution and of said flow, electrical end winding means positioned in adjoining relationship to at least the downstream end of said electrical windings, and non-magnetic and electrically non-conductive baffle means spaced from said electrical windings along said path and underlying said electrical end winding means, said baffles dividing said flow guiding means into flow passageways extending in said direction of said flow and substantially preventing flow of electrical currents transversely in relation to said path at the site of said end winding means.

2. Magnetohydrodynamic apparatus as set forth in claim 1 wherein said winding means includes a pair of end windings each positioned in adjoining relationship to a different one of the upstream and downstream ends of said electrical windings, and further comprising reactance means connected in circuit with said distributed electrical windings, and reactance means tuning each of said end windings to substantialy the same frequency.

3. Magnetohydrodynamic apparatus as set forth in claim 7 further comprising means applying electrical output signals from said downstream end winding to said upstream end winding.

4. Magnetohydrodynamic apparatus for generating electricity from a stream of electrically conductive fluid, comprising a stator assembly having core members of magnetic material spaced to form an elongated fluid flow passageway therebetween and including electrical winding means on at least one of said core members for developing a polyphase alternating magnetic field having flux lines extending across said passageway and having a field intensity distribution travelling in one longitudinal direction along said passageway at a predetermined velocity, said assembly forming paths for net electrical courrents induced in said fluid to circulate transversely in relation to said direction and transversely in relation to the direction in which said flux lines extend across said passageway, said electrical winding means being disposed on said one of said core members both to develop said field and to have polyphase electrical currents induced therein by the magnetic fields produced by said currents induced in said fluid, means having electrical reactance characteristics connected in circuit with said winding means and controlling power output characteristics of said winding means, end windings at different upstream and downstream ends of said electrical winding means, non-magnetic and electrically non-conducting baffle means dividing said passageway into a plurality of passageways at the sites of said end windings and preventing the circulation of currents transversely in relation to said direction at the sites of said end windings, and means applying electrical signals from the downstream to the upstream ones of said end windings, whereby polyphase alternating current signals produced by said winding means provide self-excitation for developing said field and overcome the power losses of said stator assembly and the reactance means and provide net electrical output for supply to a load when the velocity of said fluid exceeds said predetermined velocity.

5. Magnetohydrodynamic apparatus for generating electricity from a stream of electrically conductive fluid, comprising a stator assembly having concentric inner and outer core members of magnetic material radially spaced to form a substantially annular fluid flow passageway therebetween and including distributed polyphase-connected electrical winding means for developing a polyphase magnetic field having flux lines extending substantially radially across said passageway and having a substantially sinusoidal field intensity distribution travelling in an upstream-to-downstream axial direction along said passageway at a predetermined velocity, said annular passageway providing substantially circular paths transverse to the axis of said passageway for electrical currents induced in said conductive fluid to circulate angularly about said axis in substantially normal relation to the radial flux lines, said electrical winding means being disposed to have polyphase electrical currents induced therein by the magnetic fields produced by said currents induced in said fluid, means having electrical reactance characteristics connected in circuit with said winding means and controlling power output characteristics of said winding means at least one electrical end winding adjoining each axial upstream and downstream end of said electrical winding means, and a plurality of substantially radial non-magnetic and electrically non-conductive planar baffles at the site of each of said end winding dividing said passageway into a plurality of relatively narrow longitudinal slots in which circulation of currents angularly about said axis is substantially prevented, whereby polyphase alternating current electrical signals produced by said winding means provide self-excitation for developing said field and overcome the power losses in said stator assembly and the reactance means and provide net electrical output for supply to a load when the velocity of flow of said fluid is greater than said predetermined velocity.

6. Magnetohydrodynamic apparatus for generating electricity as set forth in claim 5 further comprising refractory insulating material coating said passageway and radial baffles and fully separating the fluid in said passageway from said stator assembly and baffles, and further wherein said baffles extend longitudinally beyond said end windings in both the upstream and downstream directions.

7. Magnetohydrodynamic apparatus for translating energy through a stream of electrically conductive fluid, comprising an elongated stator assembly having coaxial core members of magnetic material spaced to form an annular fluid flow passageway therebetween, said assembly including a plurality of electrical windings distributed along the stator assembly for developing an alternating magnetic flux field having flux lines extending across said annular passageway and having a substantially sinusoidal field intensity distribution longitudinally along said annular passageway, said annular passageway forming paths at the sites of said windings for electrical currents induced in said fluid to circulate angularly about said annular passageway, at least one pair of end windings on said stator assembly each in adjoining relationship to a different one of the upstream and downstream axial ends of said distributed windings, an array of non-magnetic and electrically non-conductive baffles extending radially between said coaxial core members and dividing said annular passageway into a plurality of longitudinal flow passages, said baffles extending longitudinally along said passageway for at least the same distance as the downstream end winding and substantially preventing flow of electrical currents angularly about said passageway at the site of said downstream end winding, a further array of non-magnetic and electrically non-conductive baffles extending radially between said core members at the site of the upstream end winding and dividing said annular passageway into a plurality of longitudinal flow passages, the baffles in said further array extending longitudinally along said passageway for at least the same distance as the upstream end winding and substantially preventing flow of electrical currents angularly about said passageway at the site of said upstream end winding, and reactance means tuning said upstream and downstream end windings to substantially the same frequency.

8. Magnetohydrodynamic apparatus for generating electricity from a stream of electrically conductive fluid, comprising electromagnetic means for developing an alternating polyphase magnetic flux field having a resultant field intensity distribution traveling in a predetermined direction at a predetermined velocity, means guiding flow of said fluid through said magnetic flux field in said predetermined direction and providing paths for electrical currents induced in said fluid to circulate transversely in relation to said direction, said electromagnetic means including polyphase-connected electrical winding means distributed along said guiding means to produce said flux field and to have electrical currents induced therein by the magnetic fields produced by said currents induced in said fluid, at least one pair of end windings each adjoining a different one of the upstream and downstream ends of said distributed polyphase-connected winding means, non-magnetic and electrically non-conductive baffling means dividing said flow guiding means into flow passages underlying said end windings which substantially prevent flow of electrical currents transversely to said direction at the sites of said end windings, means applying electrical output signals from the downstream to the upstream ones of said end windings, means having electrical reactance characteristics connected in circuit with said polyphase-connected winding means, and means having electrical reactance characteristics tuning said end windings to a predetermined frequency.

References Cited by the Examiner
UNITED STATES PATENTS

| 1,196,511 | 8/16 | Borger | 310—11 |
| 2,702,004 | 2/55 | Blake et al. | 310—11 X |
| 3,122,663 | 2/64 | Kach | 310—11 |

MILTON O. HIRSHFIELD, *Primary Examiner.*

DAVID X. SLINEY, *Examiner.*